(12) United States Patent
Yasuda

(10) Patent No.: US 11,112,314 B2
(45) Date of Patent: Sep. 7, 2021

(54) INFRARED ABSORPTIVE MATERIAL, INFRARED SENSOR, WAVELENGTH SELECTIVE LIGHT SOURCE, AND RADIATION COOLING SYSTEM

(71) Applicant: FUJIFILM CORPORATION, Tokyo (JP)

(72) Inventor: Hideki Yasuda, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/819,220

(22) Filed: Mar. 16, 2020

(65) Prior Publication Data

US 2020/0217720 A1 Jul. 9, 2020

Related U.S. Application Data

(63) Continuation of application No. PCT/JP2018/030703, filed on Aug. 20, 2018.

(30) Foreign Application Priority Data

Sep. 25, 2017 (JP) .............................. JP2017-183426

(51) Int. Cl.
*G01J 5/08* (2006.01)
*G01J 5/06* (2006.01)

(52) U.S. Cl.
CPC ............. *G01J 5/0853* (2013.01); *G01J 5/061* (2013.01); *G01J 5/0809* (2013.01)

(58) Field of Classification Search
CPC ........ G01J 5/0853; G01J 5/061; G01J 5/0809; G02B 5/22; G02B 5/26
See application file for complete search history.

(56) References Cited

U.S. PATENT DOCUMENTS

| 2005/0145964 A1* | 7/2005 | Suzuki | H01L 31/02327 257/432 |
| 2014/0211303 A1* | 7/2014 | Banerjee | G02B 5/26 359/359 |
| 2017/0248746 A1* | 8/2017 | Banerjee | G02B 5/003 |

FOREIGN PATENT DOCUMENTS

| JP | 2002-90080 A | 3/2002 |
| JP | 2007-101729 A | 4/2007 |
| JP | 2012-256041 A | 12/2012 |
| WO | 2006/117979 A1 | 11/2006 |
| WO | 2016/031547 A1 | 3/2016 |

OTHER PUBLICATIONS

International Search Report issued in International Application No. PCT/JP2018/030703 dated Nov. 20, 2018.
Written Opinion of the ISA issued in International Application No. PCT/JP2018/030703 dated Nov. 20, 2018.
(Continued)

*Primary Examiner* — Marcus H Taningco
(74) *Attorney, Agent, or Firm* — Solaris Intellectual Property Group, PLLC

(57) ABSTRACT

Provided is an infrared absorptive material having a high refractive index layer that has a refractive index of 3.0 or higher for infrared light at any wavelength in the wavelength range of 2 μm to 50 μm and has a thickness of 8 nm to 15,000 nm; and a reflective layer positioned on one face of the high refractive index layer.

11 Claims, 6 Drawing Sheets

(56) References Cited

OTHER PUBLICATIONS

International Preliminary Report on Patentability issued in International Application No. PCT/JP2018/030703 dated Aug. 7, 2019.
Raman, Aaswath P. et al., "Passive radiative cooling below ambient air temperature under direct sunlight," Nature, p. 515, p. 540-544, vol. 515, Nov. 27, 2014.

* cited by examiner

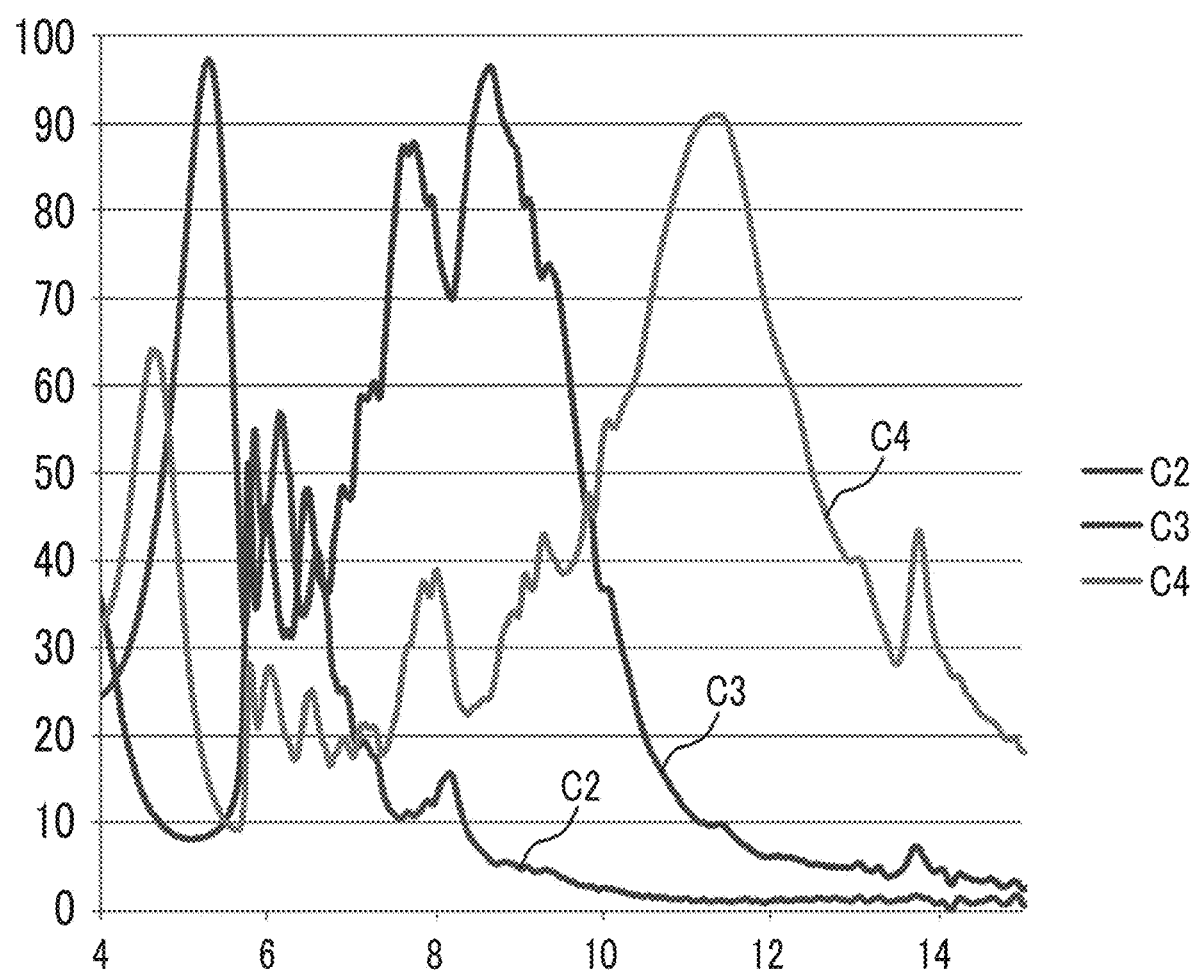

INFRARED ABSORPTIVE MATERIAL, INFRARED SENSOR, WAVELENGTH SELECTIVE LIGHT SOURCE, AND RADIATION COOLING SYSTEM

CROSS-REFERENCE TO RELATED APPLICATIONS

This application is a continuation application of International Application No. PCT/JP2018/030703, filed Aug. 20, 2018, which was published under PCT Article 21(2) in Japanese, and which claims priority from Japanese Patent Application No. 2017-183426, filed Sep. 25, 2017. The above applications are hereby expressly incorporated herein by reference in their entirety.

BACKGROUND OF THE INVENTION

1. Field of the Invention

The present disclosure relates to an infrared absorptive material, an infrared sensor, a wavelength selective light source, and a radiation cooling system.

2. Description of the Related Art

In recent years, in the use applications such as infrared sensors, wavelength selective light sources, or radiation cooling systems, infrared absorptive materials having wavelength selective absorbency are required.

For example, "an electromagnetic wave absorbing/radiating material in which a plurality of conductor discs is arranged by being spaced from a conductor surface" is described in WO2016/031547A.

Furthermore, an infrared absorptive material obtained by laminating nine layers in total, namely, respective layers of titanium, silver, silica, and hafnium oxide, on a silicon substrate is described in Aaswath P. Raman, Marc Abou Anoma, Linxiao Zhu, Eden Rephaeli and Shanhui Fan, Passive radiative cooling below ambient air temperature under direct sunlight, Nature, 515, 540-544.

SUMMARY OF THE INVENTION

With regard to the electromagnetic wave absorbing and radiating material described in WO2016/031547A, the inventors of the present invention found that it is necessary to form conductor discs by lithography or the like, and there is a problem of exhibiting low productivity.

The present inventors also found with regard to the description of Aaswath P. Raman, Marc Abou Anoma, Linxiao Zhu, Eden Rephaeli and Shanhui Fan, Passive radiative cooling below ambient air temperature under direct sunlight, Nature, 515, 540-544, that it is necessary to implement precise design of layers and close control of the film thickness, and there is also a problem of exhibiting low productivity.

An objective to be solved by embodiments of the present invention is to provide an infrared absorptive material that shows excellent wavelength selective absorbency for infrared light having any one wavelength included in the wavelength range of 2 µm to 50 µm and exhibits excellent productivity; and an infrared sensor, a wavelength selective light source, and a radiation cooling system, all of which include the above-described infrared absorptive material.

Means for solving the problems described above include the following embodiments.

<1> An infrared absorptive material comprising:
a high refractive index layer having a refractive index of 3.0 or higher for infrared light having a wavelength of 2 µm to 50 µm and having a thickness of 8 nm to 15,000 nm; and
a reflective layer positioned on one face of the high refractive index layer.

<2> The infrared absorptive material as described in the above item <1>,
in which with regard to the high refractive index layer, the optical path length n×d, which is a product of the thickness d and the refractive index n, satisfies the following Formula (1):

$$\left(\frac{1}{4} + \frac{1}{2}m\right)\lambda - \frac{1}{8}\lambda < n \times d < \left(\frac{1}{4} + \frac{1}{2}m\right)\lambda + \frac{1}{8}\lambda \quad \text{Formula 1}$$

in Formula 1, m represents an integer of 0 or greater; λ represents the wavelength of infrared radiation that is intended to be absorbed; and the units of λ and d are nm.

<3> The infrared absorptive material as described in the above item <2>,
in which m=0.

<4> The infrared absorptive material as described in any one of the above items <1> to <3>,
in which the high refractive index layer includes a binder and flat metal particles, the value obtainable by dividing an average particle size of the flat metal particles by an average thickness is 5 or greater, principal planes of the flat metal particles are planarly oriented in a range of 0° to 30° with respect to a surface of the high refractive index layer, a volume fraction of the flat metal particles in the high refractive index layer is 30% by volume or higher, and the flat metal particles are laminated in two or more layers.

<5> The infrared absorptive material as described in the above item <4>,
in which the flat metal particles are randomly arranged in a surface direction of the high refractive index layer.

<6> The infrared absorptive material as described in the above item <4> or <5>,
in which the flat metal particles contains at least silver.

<7> The infrared absorptive material as described in any one of the above items <4> to <6>,
in which the shape of the principal planes of the flat metal particles is a polygonal shape such as a hexagonal or higher polygonal shape, or a circular shape.

<8> The infrared absorptive material as described in any one of the above items <1> to <7>,
in which the refractive index of the high refractive index layer for infrared light having a wavelength of 2 µm to 50 µm is 5.0 to 30.

<9> An infrared sensor comprising:
the infrared absorptive material as described in any one of the above items <1> to <8>.

<10> A wavelength selective light source comprising:
the infrared absorptive material as described in any one of the above items <1> to <8>.

<11> A radiation cooling system comprising:
the infrared absorptive material as described in any one of the above items <1> to <8>.

According to the embodiments of the present invention, an infrared absorptive material that exhibits excellent wavelength selective absorbency for infrared light having any wavelength included in the wavelength range of 2 µm to 50

μm and exhibits excellent productivity; and an infrared sensor, a wavelength selective light source, and a radiation cooling system, all of which includes the infrared absorptive material described above, can be provided.

BRIEF DESCRIPTION OF THE DRAWINGS

FIG. 11 is a graph showing the absorption spectra of the infrared absorptive materials related to Examples C2 to C4.

DESCRIPTION OF THE PREFERRED EMBODIMENTS

Figure 1:
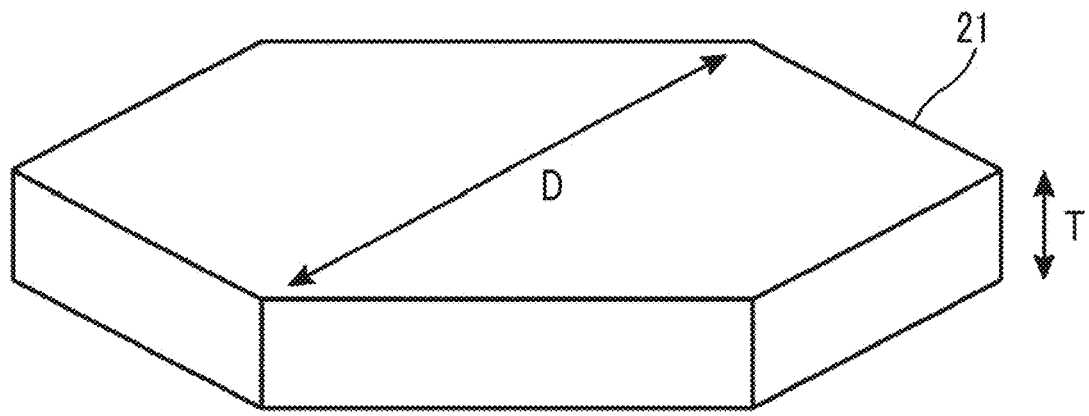
FIG. 1 is a schematic diagram illustrating an example of flat metal particles.

In the following description, the matters of the present disclosure will be described in detail. The explanation on the constitution requirements described below may be based on representative embodiments of the present disclosure; however, the present disclosure is not intended to be limited to those embodiments.

Meanwhile, in the present disclosure, the symbol "~" representing a numerical value range is used to mean that the values described before and after the symbol are included as the lower limit and the upper limit.

Regarding the term "process" as used in the present disclosure, not only independent processes but also even in a case in which a process cannot be clearly distinguished from another process, as long as a predetermined purpose of the process is achieved, the process is included in the term.

In the present disclosure, unless particularly stated otherwise, the molecular weight for a polymer component is the weight-average molecular weight (Mw) or the number average molecular weight (Mn) measured by gel permeation chromatography (GPC) in the case of using tetrahydrofuran (THF) as a solvent and calculated relative to polystyrene standards.

Meanwhile, in the present disclosure, a combination of preferred embodiments is a more preferred embodiment.

(Infrared Absorptive Material)

The infrared absorptive material according to the present disclosure has a high refractive index layer that has a refractive index of 3.0 or higher for infrared light having a wavelength of 2 μm to 50 μm and has a thickness of 8 nm to 15,000 nm; and a reflective layer positioned on one face of the high refractive index layer.

As described above, an electromagnetic wave absorbing and radiating material using a conductor disc, which is known as an infrared absorptive material exhibiting conventional wavelength selectivity, or an infrared absorptive material obtained by laminating nine layers in total, the respective layers being based on titanium, silver, silica, and hafnium oxide on a silicon substrate, have a problem that the productivity is low.

Thus, the inventors of the present invention conducted a thorough investigation, and as a result, the inventors found that the infrared absorptive material according to the present disclosure exhibits excellent wavelength selective absorbency for infrared light having any wavelength included in the wavelength range of 2 μm to 50 μm and exhibits high productivity.

The reason why excellent wavelength selective absorbency is obtained by the present structure is speculated as follows.

In a case in which a high refractive index layer having a high refractive index of 3 or higher is included, on the surface of the high refractive index layer on the opposite side of the reflective layer of the high refractive index layer, the surface reflection attributed to the refractive index difference between the layers before and after the high refractive index layer or the refractive index difference with air is increased. It is speculated that Fabry-Perot resonance occurs between the reflected light produced by the surface reflection described above and the reflective layer positioned on one face of the high refractive index layer. That is, it is speculated that the high refractive index layer itself serves as a Fabry-Perot resonator.

A conventional Fabry-Perot resonator is formed by a dielectric layer and a reflective layer formed on both faces of the dielectric layer. However, since the infrared absorptive material according to the present disclosure is such that the refractive index of the high refractive index layer for infrared light having a wavelength of 2 μm to 50 μm is 3.0 or higher, because the surface reflection is large, it is speculated that in a case in which the infrared absorptive material has a reflective layer positioned on one face, Fabry-Perot resonance occurs.

In a case in which the thickness of the high refractive index layer is adjusted to 8 nm to 15,000 nm, Fabry-Perot resonance occurs at a particular wavelength among the infrared light include in the wavelength range of 2 μm to 50 μm. Therefore, it is speculated that infrared light having the particular wavelength can be selectively absorbed, and the wavelength selective absorbency becomes excellent.

Since the infrared absorptive material according to the present disclosure can constitute an infrared absorptive material having a very simple configuration of two layers of a reflective layer and a high refractive index layer and exhibiting wavelength selective absorbency, the infrared absorptive material exhibits excellent productivity.

In the infrared absorptive material according to the present disclosure, since the refractive index of the high refractive index layer is large such as 3.0 or higher, the resonator length of Fabry-Perot resonance can be shortened, and an infrared absorptive material having low angle dependency can be easily obtained.

Low angle dependency of an infrared absorptive material means that the change in the wavelength of the infrared light to be absorbed with respect to the change in the angle of infrared light incident to the infrared absorptive material is small.

<High Refractive Index Layer>

The infrared absorptive material according to the present disclosure includes a high refractive index layer having a refractive index of 3.0 or higher for infrared light having a wavelength of 2 μm to 50 μm and having a thickness of 8 nm to 15,000 nm.

[Refractive Index]

The refractive index of the high refractive index layer for infrared light having a wavelength of 2 μm to 50 μm is 3.0 or higher, preferably 5.0 or higher, and more preferably 7.0 or higher.

The upper limit of the refractive index is not particularly limited, and for example, the upper limit may be 50 or lower, and preferably 30 or lower.

Regarding the refractive index, the spectral reflectance and the spectral transmittance are measured using a Fourier transform infrared spectrophotometer (FTIR), and the refractive index is calculated based on the multiple reflection theory and the Fresnel interference theory. The refractive index can be determined as an arithmetic mean value of the results obtained by performing measurement at a wavelength in the wavelength range of 2 μm to 50 μm at an increment of 1 μm. Furthermore, measurement is carried out at 25° C.

[Thickness]

The thickness (film thickness) of the high refractive index layer is 8 nm to 15,000 nm.

The infrared absorptive material according to the present disclosure forms a Fabry-Perot resonator in accordance with the thickness of the high refractive index layer and causes wavelength selective absorption. Therefore, in order to absorb infrared radiation having a particular wavelength by the infrared absorptive material according to the present disclosure, it is necessary to set the thickness of the high refractive index layer according to the wavelength.

In a case in which it is intended to absorb infrared radiation having a wavelength k, it is preferable that the optical path length n×d, which is a product of the thickness d and the refractive index n of the high refractive index layer, is adjusted to a value that satisfies the following Formula 1, and it is more preferable that the optical path length is adjusted to a value that satisfies the following Formula 2.

$$\left(\frac{1}{4} + \frac{1}{2}m\right)\lambda - \frac{1}{8}\lambda < n \times d < \left(\frac{1}{4} + \frac{1}{2}m\right)\lambda + \frac{1}{8}\lambda \qquad \text{Formula 1}$$

In Formula 1, m represents an integer of 0 or greater; λ represents the wavelength of infrared radiation that is intended to be absorbed; and the units of λ and d are nm. The refractive index n is the refractive index of the high refractive index layer at a wavelength k, the spectral reflectance and the spectral transmittance are measured using a Fourier transform infrared spectrophotometer (FTIR), and the refractive index n is calculated based on the multiple reflection theory and the Fresnel interference theory. The refractive index can be determined as an arithmetic mean value of the results obtained by performing measurement at a wavelength in the wavelength range of 2 μm to 50 μm at an increment of 1 μm.

In Formula 1, from the viewpoint of lowering the angle dependency, m is preferably an integer from 0 to 3, preferably an integer from 0 to 2, more preferably 0 or 1, and even more preferably 0.

For example, in a case in which the refractive index n is 5.0, and the wavelength of the infrared radiation to be absorbed is 10 μm (10,000 nm), it is preferable that the thickness d of the high refractive index layer is adjusted to a value such as from 250 nm to 750 nm (m=0), from 1,250 to 1,750 nm (m=1), from 2,250 nm to 2,750 nm (m=2), or from 3,250 nm to 3,750 nm (m=3).

$$\left(\frac{1}{4} + \frac{1}{2}m\right)\lambda - \frac{1}{16}\lambda < n \times d < \left(\frac{1}{4} + \frac{1}{2}m\right)\lambda + \frac{1}{16}\lambda \qquad \text{Formula 2}$$

In Formula 2, m, λ, d, and n have the same meanings as m, λ, d, and n in Formula 1, and preferred embodiments are also the same.

The high refractive index layer according to the present disclosure is not particularly limited as long as the refractive index for infrared light having a wavelength of 2 μm to 50 μm is 3.0 or higher; however, it is preferable that the high refractive index layer includes a binder and flat metal particles, the value obtainable by dividing the average particle size of the flat metal particles by the average thickness s 5 or greater, the principal planes of the flat metal particles are planarly oriented in the range of 0° to 30° with respect to the surface of the high refractive index layer, the volume fraction of the flat metal particles in the high refractive index layer is 30% by volume or greater, and the flat metal particles are laminated in two or more layers. Hereinafter, the high refractive index layer according to the above-described embodiment is also referred to as "particular high refractive index layer".

Since a particular high refractive index layer can be formed by liquid phase film forming, it is speculated that in a case in which the infrared absorptive material related to the present disclosure includes a particular high refractive index layer, productivity is likely to be superior.

The particular high refractive index layer includes a binder and flat metal particles. In a case in which the particle size and thickness of the flat metal particles are sufficiently smaller than infrared light, the refractive index in the particular high refractive index layer can be considered by replacing with an effective homogeneous film with an effective medium.

The refractive index of the homogeneous film is considered to be dependent on the polarization of the flat metal particles included in the particular high refractive index layer. That is, it is speculated that the refractive index of the homogeneous film can be increased by increasing the polarization of the flat metal particles.

Here, since a large number of free electrons are present in the flat metal particles used in the present structure, it is speculated that a large deviation is liable to occur in the distribution of free electrons by an incident electric field, and polarization becomes larger compared to the case of using non-metal particles.

In the present structure, the value obtainable by dividing the average particle size of the flat metal particles by the average thickness is 3 or greater, and the principal planes of the flat metal particles are planarly oriented in the range of 0° to 30° with respect to the surface of the particular high refractive index layer. It is speculated that as these flat particles are planarly oriented, the flat metal particles exhibit even larger polarization with respect to incident light.

In addition, as the volume fraction of these flat metal particles in the high refractive index layer is 20% by volume or more, the refractive index can be further increased.

Since the flat metal particles are laminated in two or more layers, the optical path length within the film increases, and an interaction between the incident light and the high refractive index layer easily occurs. Therefore, it is speculated that a particular high refractive index layer having a high refractive index can be easily formed.

[Flat Metal Particles]

The particular high refractive index layer contains flat metal particles.

—Shape—

Flat metal particles are particles comprising two principal planes facing each other, and although the shape of the principal planes is not particularly limited, examples include an octagonal shape, a hexagonal shape, a triangular shape, and a circular shape. Among these, from the viewpoint of increasing the transmittance for infrared radiation, it is preferable that the shape of the principal planes is a polygonal shape such as a hexagonal or higher polygonal shape, or a circular shape.

According to the present disclosure, a circular shape refers to a shape in which the number of sides each having a length of 50% or more of the average equivalent circle diameter of the flat metal particles that will be described below is zero per flat metal particle. The circular-shaped flat metal particle is not particularly limited as long as it has a round shape without corners in a case in which the flat metal particle is observed from the upper side of the principal plane using a transmission electron microscope (TEM).

In the present specification, a hexagonal shape refers to a shape in which the number of sides each having a length of 20% or more of the average equivalent circle diameter of the flat metal particles that will be described below is six per flat metal particle. Meanwhile, the same also applies to other polygons. The hexagonal-shaped flat metal particle is not particularly limited as long as the flat metal particle has a hexagonal shape in a case in which the flat metal particle is observed from the upper side of the principal plane with a transmission electron microscope (TEM), and can be selected as appropriate according to the purpose. For example, the corners of the hexagonal shape may be of acute angles or of obtuse angles; however, from the viewpoint that absorption in the visible light region can be reduced, it is preferable that the hexagonal shape has at least one obtuse angle, and it is more preferable that all of the six corners are of obtuse angles. The angle of the obtuse angle is not particularly limited and can be selected as appropriate according to the purpose.

With regard to the corners of the hexagonal shape, the corners may be blunt. A corner being blunt means a state in which a corner is not formed by two straight lines, but the apex of the corner has a roundish shape. The degree of bluntness of the corner is not particularly limited and can be selected as appropriate according to the purpose.

—Average Particle Size (Average Equivalent Circle Diameter)—

The equivalent circle diameter is represented by the diameter of a circle having the same area as the projected area of an individual particle. The projected area of an individual particle can be obtained by a known method of measuring the area in an electron micrograph and compensating the area by the magnification ratio of imaging. The average particle size (average equivalent circle diameter) is obtained by obtaining the particle diameter distribution (particle size distribution) of the equivalent circle diameter D of two hundred flat metal particles and calculating the arithmetic mean thereof.

The average particle size is not particularly limited; however, the average particle size is preferably 50 nm to 2,000 nm, more preferably 70 nm to 1,500 nm, and even more preferably 100 nm to 1,000 nm.

—Average Thickness and Aspect Ratio—

The average thickness of the flat metal particles is preferably 50 nm or less, more preferably 2 nm to 25 nm, and particularly preferably 4 nm to 15 nm.

Figure 2:
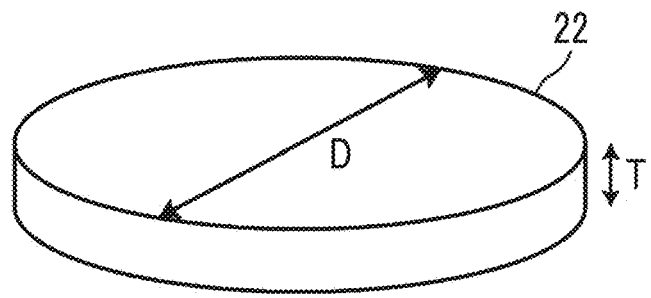
FIG. 2 is a schematic diagram illustrating another example of flat metal particles.

The particle thickness T corresponds to the distance between the principal planes of a flat metal particle, and for example, the particle thickness T is as shown in FIG. 1 and FIG. 2. The particle thickness T can be measured by transmission electron microscope (TEM).

Regarding the method of measuring the average particle thickness by TEM, a method of subjecting a film containing flat metal particles to a coating treatment based on carbon vapor deposition or metal vapor deposition, producing a cross-section slice by focused ion beam (FIB) processing, and performing the measurement of the particle thickness by observing the cross-section by TEM, and the like may be mentioned.

The value D/T obtainable by dividing the average particle size D of the flat metal particles by the average thickness T (also referred to as "aspect ratio") is not particularly limited as long as the value is 3 or larger, and the value can be selected as appropriate according to the purpose. However, from the viewpoints of the trade-off between high refractive index and the scattering loss of incident light, the value is preferably 5 to 100, and more preferably 5 to 60.

In a case in which the aspect ratio is 3 or larger, it is possible to obtain a high refractive index, and in a case in which the aspect ratio is 100 or less, the scattering loss of incident light can also be suppressed.

The ratio of the maximum length and the minimum length in a principal plane at the time of observing a particle from the upper direction is not particularly limited and can be selected as appropriate according to the purpose; however, from the viewpoint of suppressing anisotropy of the refractive index, the ratio is preferably 10 or less.

—Planar Orientation—

Within the particular high refractive index layer, the principal planes of the flat metal particles are planarly oriented in the range of 0° to 30° with respect to the surface of the particular high refractive index layer.

This will be described below using FIG. 3.

Figure 3:
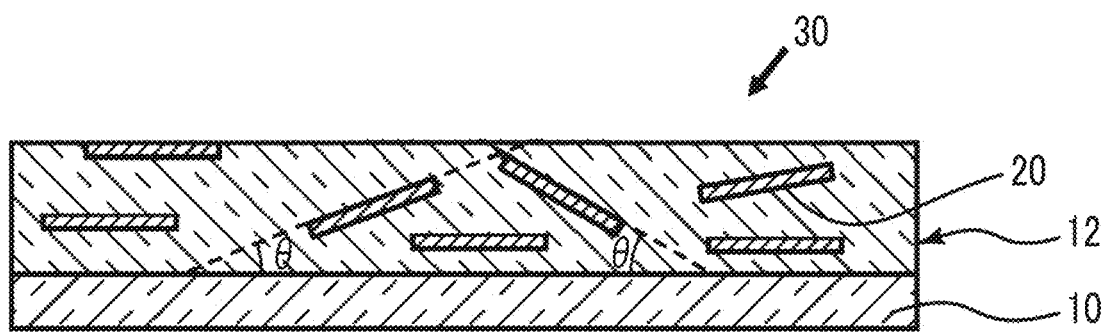
FIG. 3 is a schematic cross-sectional view illustrating an example of a high refractive index layer 12 containing flat metal particles 20.

FIG. 3 is a schematic cross-sectional view illustrating an example of the particular high refractive index layer 12 including flat metal particles 20, in the particular high refractive index layer according to the present disclosure. The infrared absorptive material 30 in FIG. 3 has a particular high refractive index layer 12 and a reflective layer 10. In the following description, the angle θ formed by the reflective layer 10 and a principal plane (face that determines the equivalent circle diameter D) of a flat metal particle 20 will be described using FIG. 3.

In FIG. 3, the angle (absolute value of angle θ) formed by the surface of the particular high refractive index layer 12 (interface with the reflective layer 10) and a principal plane (face that determines the equivalent circle diameter D) of the flat metal particle 20 or an extension line of the principal plane is 0° to 30°. Meanwhile, the angle θ refers to the angle of smaller side between the angles formed by the surface of the particular high refractive index layer 12 and a principal plane (face that determines the equivalent circle diameter D) of the flat metal particle 20 or an extension line of the principal plane.

According to the present disclosure, the description that the principal planes of the flat metal particles are planarly oriented in the range of 0° to 30° with respect to the surface of the particular high refractive index layer, implies that the arithmetic mean value of the absolute value of the θ measured for any arbitrary one hundred particles is 0° to 30°. Meanwhile, the above-mentioned arithmetic mean value is also referred to as "degree of planar orientation".

The absolute value of the θ is measured by a method of producing a cross-section slice of the particular high refractive index layer, and evaluating by observing the high refractive index layer and the flat metal particles in this slice.

Specifically, a method of producing a cross-section slice sample of the particular high refractive index layer using a focused ion beam (FIB), and evaluating an image obtained by observing this sample using a transmission electron microscope (TEM), may be mentioned.

Regarding the method for observing a cross-section slice sample produced as described above, there are no particular limitations as long as it can be checked thereby whether the principal planes of the flat metal particles are planarly oriented with respect to the surface of the high refractive index layer in the sample; however, for example, a method of using TEM or the like may be mentioned. In the case of a cross-section slice sample, observation may be carried out by TEM.

The principal planes of the flat metal particles are planarly oriented in the range of 0° to 30° with respect to the surface of the particular high refractive index layer, and it is preferable that the principal planes are planarly oriented in the range of 0° to 20°, and more preferably planarly oriented in the range of 0° to 10°. It is more preferable that at the time of observing a cross-section of the particular high refractive index layer, the flat metal particles 20 are oriented in a state in which the angle (±θ) shown in FIG. 3 is small. In a case in which θ is 30° or less, the magnitude of polarization occurring within the flat metal particles becomes large, and a high refractive index (for example, the refractive index for a wavelength of 2 μm to 50 μm is 5.0 or higher, or the like) is easily obtained.

—Materials—

The material for the flat metal particles is not particularly limited and can be selected as appropriate according to the purpose; however, from the viewpoint of having low absorbance for infrared radiation, silver, gold, aluminum, copper, rhodium, nickel, platinum, titanium, alloys thereof, and the like are preferred, and among them, silver is more preferred.

—Percentage Content of Flat Metal Particles—

According to the present disclosure, one kind of flat metal particles may be used alone, or two or more kinds thereof may be used in combination.

From the viewpoint of increasing the refractive index, the volume fraction of the flat metal particles in the particular high refractive index layer is preferably 30% by volume or more, more preferably 35% by volume or more, and even more preferably 40% by volume or more.

Regarding the volume fraction of the flat metal particles in the particular high refractive index layer, for example, a method of producing an appropriate cross-section slice and evaluating by observing the abundance of the flat metal particles in this slice can be employed. The method of observing a cross-section slice is similar to the method of observing a cross-section slice in the case of measuring the absolute value of θ in the planar orientation described above.

—State of Lamination of Flat Metal Particles—

It is preferable that the flat metal particles are laminated in two or more layers within the particular high refractive index layer, and it is more preferable that the flat metal particles are laminated in three or more layers. The upper limit is not particularly limited; however, the upper limit is preferably 50 layers or fewer.

Here, lamination in two or more layers can be checked by producing a cross-section slice and observing the state of lamination of the flat metal particles in this slice. Specifically, in a case in which a cross-section slice sample of the particular high refractive index layer is produced using a focused ion beam (FIB) or the like, and this is observed using various microscopes (for example, TEM or the like), at the time of drawing one hundred lines at an interval of the average particle size in a direction perpendicular to the film plane, in a case in which 75 or more lines cross two or more flat metal particles, it is defined that the flat metal particles are laminated in two or more layers.

Similarly, in a case in which 75 or more lines cross three or more flat metal particles, it is defined that the flat metal particles are laminated in three or more layers. Hereinafter, the same also applies to four or more layers.

—State of Arrangement of Flat Metal Particles—

It is preferable that the flat metal particles are randomly arranged in the surface direction of the particular high refractive index layer.

The flat metal particles being randomly arranged in the surface direction of the particular high refractive index layer implies that the particle coordinates in a direction parallel to the surface of the particular high refractive index layer are random. Here, being random implies that in the power spectrum of the spatial frequency obtainable by subjecting the particle coordinates in a direction parallel to the particular high refractive index layer to Fourier transformation, no meaningful maximum point other than the point of origin occurs. Here, the peak of the spatial frequency 1/R (wherein R represents the average particle size) occurring as a result of expulsion between particles is not regarded as a maximum point.

Specifically, in a case in which a cross-section sample or a cross-section slice sample of the particular high refractive index layer is produced using a focused ion beam (FIB) or the like, and this is observed using various microscopes (a transmission electron microscope (TEM) and the like), the central coordinates in the surface direction of the particular high refractive index layer and in a direction parallel to the above-mentioned direction are determined for one hundred flat metal particles, and the randomness can be evaluated from the power spectrum of the spatial frequency obtained by subjecting this coordinates to Fourier transformation.

—Plasmon Resonance—

It is preferable that the flat metal particles exhibit localized surface plasmon resonance, it is more preferable that the flat metal particles have a plasmon resonance wavelength in the wavelength range of 0.5 μm to 5 μm, and it is even more preferable that the particles have a plasmon resonance wavelength in the wavelength range of 0.8 μm to 5 μm.

As the flat metal particles exhibit localized surface plasmon resonance, for example, absorption of visible light (light having a wavelength of 400 nm or more and less than 780 nm) occurs, and thus it is also possible to lower the transmittance for visible light.

The plasmon resonance wavelength of the flat metal particles can be adjusted by means of the material for the flat metal particles and the refractive index of the binder that will be described below.

The plasmon resonance wavelength is measured by calculating the spectral reflectance using a Fourier transform infrared spectrophotometer (FTIR) or a spectrophotometer and calculating the maximum point of the spectral reflectance. In the case of having the plasmon resonance wavelength at 0.8 μm to 2.5 μm, it is preferable to use a spectrophotometer, and in the case of having the plasmon resonance wavelength at 2.5 μm to 5.0 μm, it is preferable to use a Fourier transform infrared spectrophotometer.

—Method for Synthesizing Flat Metal Particles—

The method for synthesizing the flat metal particles is not particularly limited and can be selected as appropriate according to the purpose, and for example, liquid phase methods such as a chemical reduction method, a photochemical reduction method, and an electrochemical reduction method may be mentioned as methods capable of synthesizing flat metal particles (particularly, flat metal particles having a polygonal shape such as a hexagonal shape or higher polygonal shape, or a circular shape). Among these, from the viewpoint of the controllability of shape and size, liquid phase methods such as a chemical reduction method and a photochemical reduction method are particularly preferred. After hexagonal- to triangular-shaped flat metal particles are synthesized, for example, an etching treatment using a dissolving species that dissolves silver, such as nitric acid or sodium sulfite, an aging treatment by heating, or the like is carried out, thereby the corners of the hexagonal- to triangular-shaped flat metal particles can be blunted, and thus hexagonal-shaped or circular-shaped flat metal particles may be obtained.

Regarding the method for synthesizing the flat metal particles, in addition to that, seed crystals may be fixed in advance to the surface of the reflective layer that will be described below, and then crystals of metal particles (for example, Ag) may be grown into a flat shape.

In the particular high refractive index layer according to the present disclosure, the flat metal particles may be subjected to a further treatment in order to impart desired characteristics to the particles. Examples of the further treatment include formation of a high refractive index shell layer, and addition of various additives such as a dispersant and an antioxidant.

[Binder]

The particular high refractive index layer according to the present disclosure includes a binder.

The binder is not particularly limited; however, it is preferable that the binder is a material that can retain flat metal particles in a dispersed state. From the viewpoint of productivity, it is preferable that the binder is a material that can form a film in a liquid phase.

It is preferable that the binder in the metal particle-containing layer includes a polymer, a rubber, or an inorganic substance formed by a sol-gel method, and it is preferable that the binder includes a polymer.

Preferred examples of the polymer include, for example, polymers such as a polyolefin resin, a cyclic polyolefin resin, a polyvinyl acetal resin, a polyvinyl alcohol resin, a polyvinyl butyral resin, a polyacrylate resin, a polymethyl methacrylate resin, a polycarbonate resin, a polyvinyl chloride resin, a (saturated) polyester resin, a polyurethane resin, and a natural polymer such as gelatin or cellulose.

Among them, from the viewpoint of transparency to infrared light, it is preferable that the main polymer is a polyolefin resin or a cyclic polyolefin resin.

Regarding the polymer, any polymer that is commercially available can be preferably used, and examples include ARROWBASE, which is a modified polyolefin resin manufactured by Unitika, Ltd.; CHEMIPEARL, which is an aqueous dispersion of a polyolefin manufactured by Mitsui Chemicals, Inc.; HARDLEN, which is a modified polyolefin resin manufactured by Toyobo Co., Ltd.; and HIGH-TECH manufactured by Toho Chemical Industry Co., Ltd.

In the present disclosure, the term main polymer means a polymer component that occupies 50% by mass or more of the polymers included in the particular high refractive index layer.

Regarding the rubber, known ones can be used; however, from the viewpoint of transmissibility to infrared light, it is preferable to use nitrile rubber, ethylene-propylene rubber, butyl rubber, or the like.

Regarding the inorganic substance formed by a sol-gel method, known ones can be used. Examples of such a material include oxides such as silica and titanium oxide; and fluorides such as magnesium fluoride.

It is preferable that the binder according to the present disclosure is transparent to infrared light. According to the present disclosure, being "transparent to infrared light" means that the transmittance for infrared light at any wavelength in the range of 2 μm to 50 μm is 20% or higher, preferably 30% or higher, and more preferably 50% or higher. The upper limit of the transmittance is not particularly limited, and the transmittance may be 100% or lower. The transmittance is measured by using the spectral reflectance using a Fourier transform infrared spectrophotometer (FTIR) or a spectrophotometer.

—Refractive Index—

The refractive index of the binder used for the present disclosure is preferably 1.3 or higher, more preferably 1.4 or higher, and even more preferably 1.5 or higher.

In a case in which the refractive index of the binder is in the above-described range, the refractive index of the particular high refractive index layer can be further increased.

The refractive index of the binder is determined by measuring the spectral reflectance and the spectral transmittance using a Fourier transform infrared spectrophotometer (FTIR) and calculating the refractive index based on the multiple reflection theory and the Fresnel interference theory.

—Percentage Content—

It is preferable that the particular high refractive index layer according to the present disclosure contains the binder in an amount of 10% by volume to 70% by volume, more preferably in an amount of 15% by volume to 70% by volume, and even more preferably in an amount of 25% by volume to 60% by volume.

The percentage content of the binder is calculated by a method similar to that for the percentage content of the flat metal particles.

[Other Components]

The particular high refractive index layer according to the present disclosure may contain other components in addition to the flat metal particles and the binder. Examples of the other components include air and known additives.

<Reflective Layer>

The infrared absorptive material according to the present disclosure has a reflective layer.

In the present disclosure, the reflective layer is a layer that reflects at least infrared light having a wavelength of 2 µm to 50 µm, and the reflectance for infrared light having a wavelength of 2 µm to 50 µm is preferably 50% to 100%.

The reflectance in the reflective layer can be determined by measuring the spectral reflectance and the spectral transmittance using a Fourier transform infrared spectrophotometer (FTIR) and calculating the arithmetic mean value of the results obtained by performing the measurement at a wavelength in the wavelength range of 2 µm to 50 µm at an increment of 1 µm.

It is preferable that the reflective layer is in contact with the high refractive index layer.

The reflective layer is preferably a Bragg mirror layer or a metal layer, and more preferably a metal layer.

Regarding the Bragg mirror layer, a Bragg mirror in which dielectric layers are laminated, and specifically, for example, a known Bragg mirror obtained by alternately laminating the low refractive index layer and a high refractive index layer, or the like is used.

Examples of the metal layer include layers containing metal materials such as aluminum, silver, gold, copper, platinum, chromium, nickel, tungsten, and titanium, and it is preferable that the metal layer contains aluminum, silver, gold, or copper.

The film thickness of the reflective layer is preferably 3 nm or more in order to cause reflection at the interface with the high refractive index layer, and it is particularly preferable to have a film thickness of 10 nm or more. The upper limit of the film thickness is not particularly limited, and for example, the upper limit may be 1 mm or less.

The method for producing the reflective layer is not particularly limited and can be selected from among production methods of known liquid phase methods and gas phase methods. Above all, it is preferable to produce the reflective layer by a gas phase method that can cause strong reflection at the interface with the high refractive index layer with high quality. Examples of the production method according to such a gas phase method include a vapor deposition method and a sputtering method.

<Other Layers>

The infrared absorptive material according to the present disclosure may have other layers.

Examples of the other layers include a pressure sensitive adhesive layer, a hard coat layer, and a back coat layer, as described in paragraph 0075 to paragraph 0080 of JP2015-129909A. Furthermore, examples of the other layers include an ultraviolet absorptive layer and an antifouling layer.

The infrared absorptive material according to the present disclosure may also have a substrate layer on the opposite side of the reflective layer with respect to the high refractive index layer, or on the opposite side of the high refractive index layer with respect to the reflective layer.

The substrate layer is a layer formed from a substrate, and the substrate is not particularly limited; however, it is preferable to use a substrate having high transmittance to infrared radiation.

Regarding the substrate having high transmittance to infrared radiation, for example, a substrate having a transmittance for infrared light having any one wavelength in the range of 2 µm to 50 µm is 50% or higher may be mentioned.

Examples of the substrate having high transmittance to infrared radiation include, as inorganic materials, silicon, germanium, chalcogenide glass, quartz glass, sapphire, calcium fluoride, barium fluoride, magnesium fluoride, zinc selenide, zinc sulfide, and diamond.

Particularly, it is preferable to use silicon, germanium, chalcogenide glass, quartz glass, or the like, all of which have high transmittance for infrared radiation and excellent environmental durability.

Examples of the substrate having high transmittance to infrared radiation include, as organic materials, films formed from polyolefin-based resins such as a polyolefin-based resin, a cyclic polyolefin-based resin, poly(4-methylpentene-1), and polybutene-1; polyester-based resins such as polyethylene terephthalate and polyethylene naphthalate; a polycarbonate-based resin, a polyvinyl chloride-based resin, a polyphenylene sulfide-based resin, a polyether sulfone-based resin, a polyethylene sulfide-based resin, a polyphenylene ether-based resin, a styrene-based resin, an acrylic resin, a polyamide-based resin, a polyimide-based resin, and cellulose-based resins such as cellulose acetate, or laminate films of these. Among these, a polyolefin-based resin film and a cyclic polyolefin-based resin film are suitable. Specific, commercially available films can also be preferably used, and for example, ARTON manufactured by JSR Corporation, ZEONEX manufactured by Zeon Corporation, and TOPAS manufactured by Polyplastics Co., Ltd. may be mentioned as specific examples.

<Method for Producing Infrared Absorptive Material>

The infrared absorptive material according to the present disclosure can be produced by, for example, forming a reflective layer by a gas phase method on a substrate and forming a high refractive index layer (preferably, particular high refractive index layer) by a liquid phase method on the reflective layer.

According to an embodiment, for example, a method including a step of forming a reflective layer on a substrate (reflective layer forming step), a step of applying a coating liquid for forming a high refractive index layer on the reflective layer (coating step), and a step of drying the applied coating liquid for forming a high refractive index layer as necessary (drying step), may be mentioned.

[Reflective Layer Forming Step]

In the reflective layer forming step, it is preferable that a reflective layer is formed on a substrate.

The method for forming a reflective layer is not particularly limited and is carried out by the above-mentioned liquid phase method or gas phase method, and examples include a vapor deposition method and a sputtering method.

[Coating Step]

The coating method in the coating step is not particularly limited, and any known method can be used.

Examples of the coating method include methods of applying by means of a spin coater, a dip coater, a die coater, a slit coater, a bar coater, a gravure coater, and the like; and methods of inducing planar orientation by methods such as an LB (Langmuir-Blodgett) film method, a self-assembly method, and spray coating.

—Coating Liquid for Forming High Refractive Index Layer—

It is preferable that the coating liquid for forming a high refractive index layer includes flat metal particles and a binder, and may further contain known solvents, known additives, and the like.

It is preferable that the flat metal particles are dispersed in the coating liquid.

The coating liquid for forming a high refractive index layer may include a raw material of the binder. Examples of the raw material of the binder include a polymerizable compound and a polymerization initiator, and particularly by containing a polymerizable compound and a photopolymerization initiator, a high refractive index layer can be formed patternwise by exposure to light.

In a case in which the coating liquid for forming a high refractive index layer includes the above-described raw material of the binder, it is preferable that the method for producing the high refractive index layer according to the present disclosure further includes a step of forming a binder.

In the step of forming a binder, for example, a method of curing at least a portion of the applied coating liquid for forming a high refractive index layer by means of any known method such as exposure to light or heating, is employed.

[Drying Step]

Regarding the drying method for the drying step, any known drying method is used without particular limitations. For example, heated drying at normal pressure or under reduced pressure, and natural drying may be used. The heating method for the heated drying is not particularly limited, and for example, a method of heating using an apparatus such as a hot plate or an oven may be used.

(Infrared Sensor)

It is preferable that the infrared sensor according to the present disclosure includes the infrared absorptive material according to the present disclosure.

Regarding the infrared sensor, for example, a sensor comprising a solid-state imaging element and the infrared absorptive material according to the present disclosure may be mentioned.

Examples of the solid-state imaging element include a CCD (Charge-Coupled Device) sensor, a CMOS (complementary metal oxide semiconductor) sensor, and an organic CMOS sensor.

(Wavelength Selective Light Source)

The wavelength selective light source according to the present disclosure includes the infrared absorptive material according to the present disclosure.

Under Kirchhoff s Law related to radiation energy, the absorbance and the emissivity of an object become equal. That is, the infrared absorptive material according to the present disclosure can be used as a wavelength selective infrared radiating material at any arbitrary wavelength of from 2 μm to 50 μm.

Therefore, the infrared absorptive material according to the present disclosure can also be used as a wavelength selective infrared radiating material and is suitably used as a radiating material for wavelength selective light source.

For example, with regard to the infrared absorptive material according to the present disclosure, in a case in which the infrared absorptive material is used as a wavelength selective light source, radiating the wavelength matching the absorption peak of the object to be heated is realized.

(Radiation Cooling System)

The radiation cooling system according to the present disclosure includes the infrared absorptive material according to the present disclosure.

According to the radiation cooling system, an object to be cooled, which is accommodated in the inside, is cooled by utilizing a radiation cooling phenomenon. That is, the radiation cooling apparatus according to the present example has an internal space that accommodates the object to be cooled. For example, the infrared absorptive material according to the present disclosure constitutes a portion of partition walls for defining the internal space and is disposed on the air side as viewed from the internal space.

Regarding the radiation cooling system, more specifically, for example, the radiation cooling system described in A. P. Raman, et al., "Passive radiative cooling below ambient air temperature under direct sunlight", Nature, Vol. 515, 540, 2014, may be mentioned.

In the case of being used in a radiation cooling system, it is preferable that the infrared absorptive material according to the present disclosure absorbs at least infrared light in the wavelength range of 8 μm to 14 μm, which is called the atmospheric window. As described above, since the infrared absorptive material according to the present disclosure can be used as a wavelength selective infrared radiating material for any arbitrary wavelength at a wavelength of 2 μm to 50 μm, the infrared absorptive material is suitably used as a radiating material for a radiation cooling system.

EXAMPLES

Hereinafter, the present disclosure will be described in detail by way of Examples. The materials, amounts of use, proportions, treatment content, treatment procedure, and the like disclosed in the following Examples can be modified as appropriate as long as the purport of the embodiments of the present disclosure is maintained. Therefore, the scope of the embodiments of the present disclosure is not limited to the specific examples described below. Meanwhile, in the present Examples, the units "parts" and "percent (%)" mean "parts by mass" and "percent (%) by mass", unless particularly stated otherwise.

<Results of Multilayer Film Simulation>

An optical simulation of the absorbance of a laminated structure of a reflective layer and a high refractive index layer was carried out using a thin film calculation software program, Essential Macleod, manufactured by Thin Film Center, Inc.

In the various Examples or Comparative Examples, infrared absorptive materials were designed such that the refractive index, extinction coefficient, and film thickness of the high refractive index layer were adjusted to the values described in Table 1. As a reflective layer, silver was used. The absorbance at the wavelength of an absorption peak that was closest to the wavelength λ=10,000 nm at the time of incidence at the front and at the time of incidence at 45°, the absorbance at the absorption peak wavelength at the time of incidence at the front, and the full-width at half maximum (FWMH) Γ of absorption were evaluated. In a case in which the value of Γ/λ was less than 0.4, the wavelength selectivity was considered satisfactory (1); in a case in which the value of Γ/λ was 0.4 or more and less than 0.6, the wavelength selectivity was considered acceptable (2); and in a case in which the value of Γ/λ was 0.6 or more, the wavelength selectivity was considered defective (3). The evaluation results are described in the column of "Wavelength selectivity" in Table 1. It can be said that as the value of Γ/λ is smaller, the wavelength selectivity is superior. Furthermore, it can be said that as the difference in the wavelength of the absorption peaks in the respective cases of incidence at the front and incidence at 45° is smaller, the angle dependency is smaller.

The evaluation results are described in the following Table 1.

TABLE 1

| | Reflective layer Material | Refractive index n | Extinction coefficient | Film thickness d | Incidence at front | Incidence at 45° |
|---|---|---|---|---|---|---|
| Example A1 | Ag | 3 | 0.1 | 833 | 10000 | 9800 |
| Example A2 | Ag | 5 | 0.1 | 500 | 10000 | 9900 |
| Example A3 | Ag | 7 | 0.1 | 340 | 10000 | 9950 |
| Example A4 | Ag | 10 | 0.1 | 230 | 10000 | 9970 |
| Example A5 | Ag | 15 | 0.1 | 146 | 10000 | 9980 |
| Example A6 | Ag | 10 | 0.3 | 230 | 10000 | 9970 |
| Example A7 | Ag | 10 | 0.1 | 115 | 5400 | 5370 |
| Example A8 | Ag | 10 | 0.1 | 460 | 6400 | 6350 |
| Example A9 | Ag | 10 | 0.1 | 730 | 10000 | 9940 |
| Comparative Example A1 | Ag | 2 | 0.1 | 1250 | 10000 | 9500 |
| Comparative Example A2 | — | 10 | 0.1 | 230 | 4600 | 4550 |

| | Absorbance | FWHM Γ | Γ/λ | Wavelength selectivity | Formula 1 (λ = 10,000 nm) m = 0 | m = 1 |
|---|---|---|---|---|---|---|
| Example A1 | 51% | 5000 | 0.50 | 2 | Satisfied | Not satisfied |
| Example A2 | 53% | 3200 | 0.32 | 1 | Satisfied | Not satisfied |
| Example A3 | 58% | 2100 | 0.21 | 1 | Satisfied | Not satisfied |
| Example A4 | 67% | 1500 | 0.15 | 1 | Satisfied | Not satisfied |
| Example A5 | 82% | 1200 | 0.12 | 1 | Satisfied | Not satisfied |
| Example A6 | 93% | 2000 | 0.20 | 1 | Satisfied | Not satisfied |
| Example A7 | 66% | 900 | 0.17 | 1 | Not satisfied | Not satisfied |
| Example A8 | 92% | 450 | 0.07 | 1 | Not satisfied | Not satisfied |
| Example A9 | 93% | 700 | 0.07 | 1 | Not satisfied | Satisfied |
| Comparative Example A1 | 52% | 8200 | 0.82 | 3 | Satisfied | Not satisfied |
| Comparative Example A2 | 6% | — | — | — | Satisfied | Not satisfied |

In the present simulation, the refractive index in the various Examples and Comparative Examples was calculated as an arithmetic mean value of the results obtained by performing a simulation at a wavelength in the wavelength range of 2 μm to 50 μm at an increment of 1 μm.

In Table 1, the unit for the film thickness d and the absorption peak wavelength is nm, and in the column of m=0 (or m=1), it is described that in a case in which the wavelength λ=10,000, the refractive index n, and the film thickness d are set to the values of each example described in Table 1, whether Formula 1 is satisfied in the case of setting as m=0 (or m=1). In Comparative Example 2, a reflective layer was not formed.

From the results described in Table 1, it was found that an infrared absorptive material comprising a high refractive index layer having a refractive index of 3.0 or higher for infrared light at any wavelength in the wavelengths of 2 μm to 50 μm and having a thickness of 8 nm to 15,000 nm; and a reflective layer positioned on one face of the high refractive index layer, acquires wavelength selectivity at any wavelength in the wavelengths of 2 μm to 50 μm.

It was also found that in the case of a wavelength λ=10,000 nm and m=0 or 1, in a case in which the refractive index n and the film thickness d satisfy Formula 1, wavelength selective absorption at a wavelength of 10,000 nm is obtained.

Figure 4:
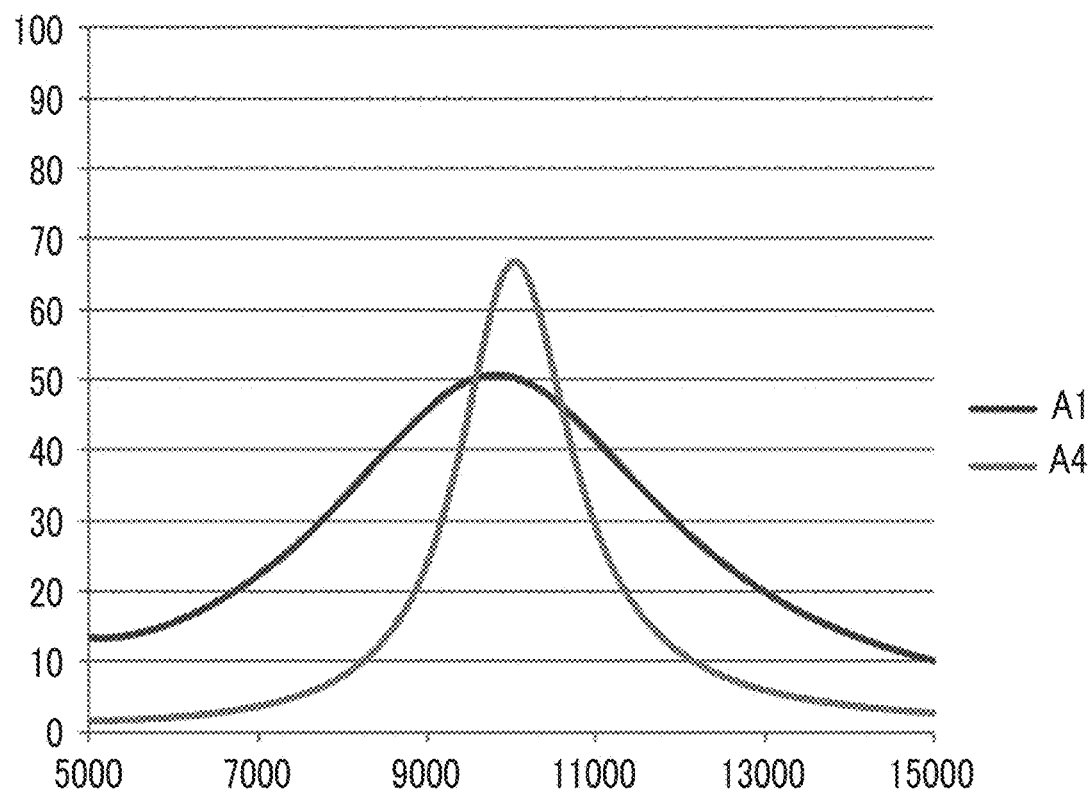
FIG. 4 is a graph showing the absorption spectra of Examples A1 and A4.

FIG. 4 shows the absorption spectra for Examples A1 and A4.

In FIG. 4, the axis of ordinate represents the absorbance (%), and the axis of abscissa represents the wavelength (nm).

It can be seen that in all of the Examples, the infrared absorptive materials have selective absorption near a wavelength of 10,000 nm.

Figure 5:
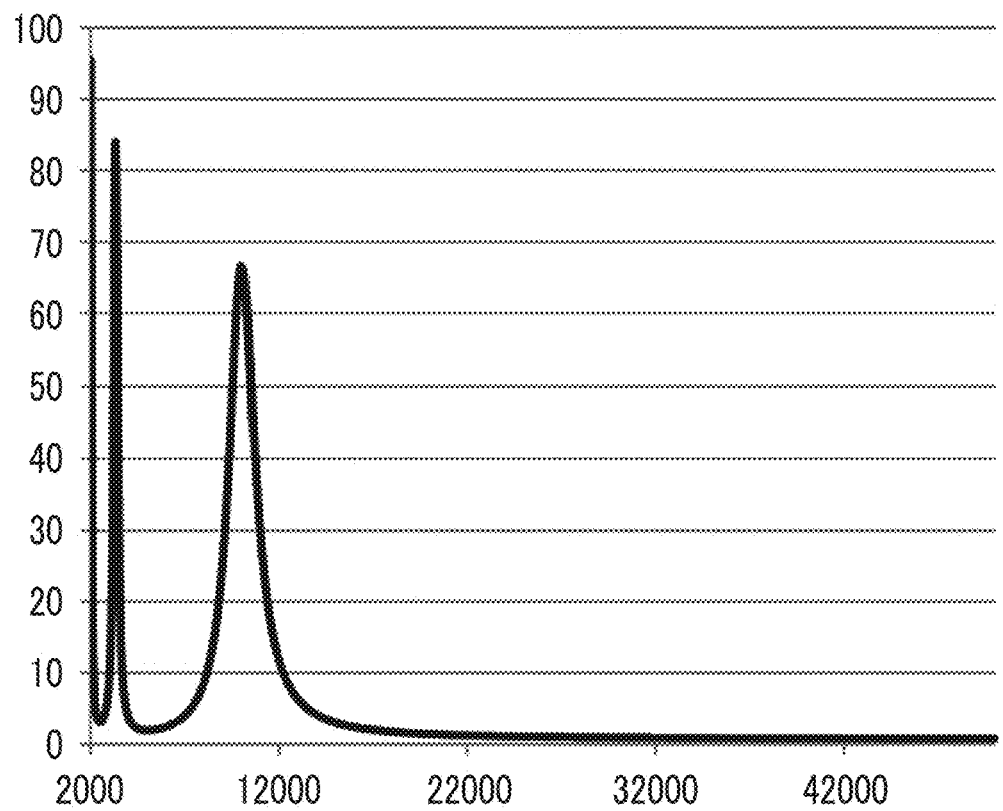
FIG. 5 is a graph showing the absorption spectrum of Example A4.
Figure 6:
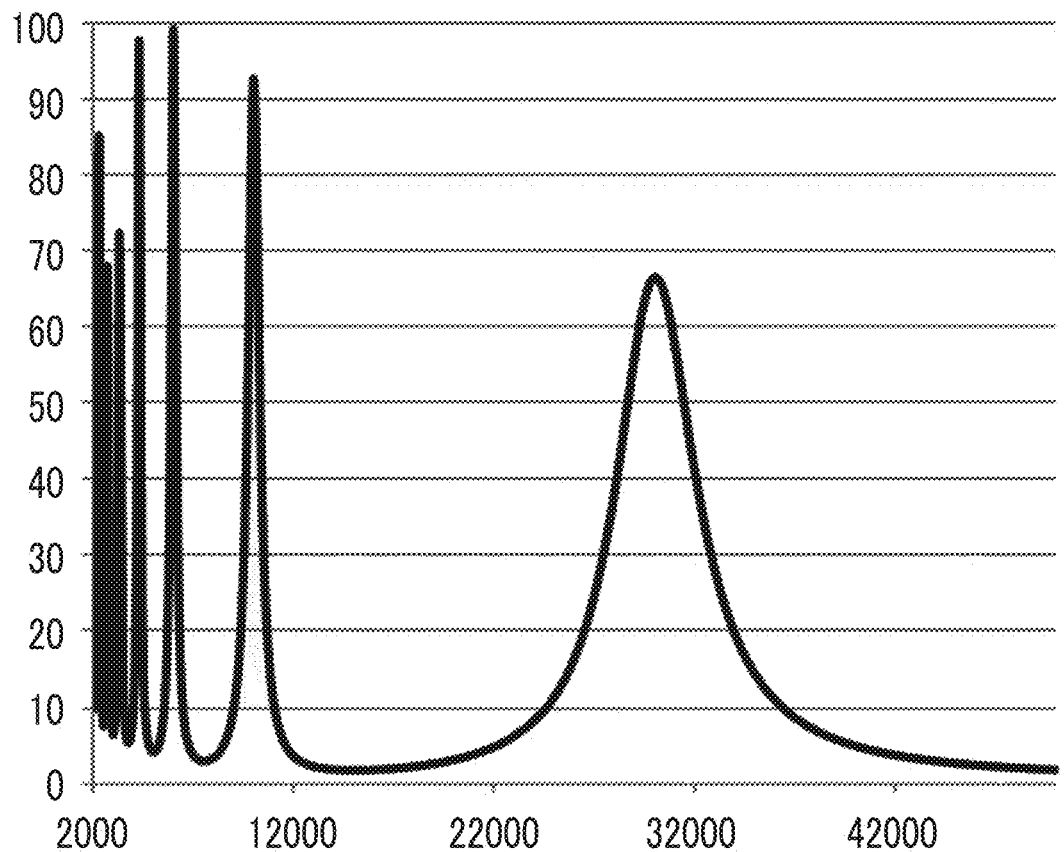
FIG. 6 is a graph showing the absorption spectrum of Example A9.

FIG. 5 shows the absorption spectrum for Example A4, and FIG. 6 shows the absorption spectrum for Example A9.

In FIG. 5 and FIG. 6, the axis of ordinate represents the absorbance (%), and the axis of abscissa represents the wavelength (nm).

It can be seen that in all of the Examples, the infrared absorptive materials have selective absorption at a plurality of wavelengths included in the wavelength range of 2 μm to 50 μm.

<Evaluation of Refractive Index of Particular High Refractive Index Layer>

For the particular high refractive index layer, an evaluation of the refractive index was carried out.

The particular high refractive index layer is a layer containing a binder and flat metal particles, in which the value (aspect ratio) obtainable by dividing the average particle size of the flat metal particles by the average thickness is 5 or greater, the principal planes of the flat metal particles are planarly oriented in the range of 0° to 30° with respect to the surface of the high refractive index layer, the volume fraction of the flat metal particles in the high refractive index layer is 30% by volume or more, and the flat metal particles are laminated in two or more layers.

[Evaluation of Aspect Ratio of Flat Metal Particles]

An analysis of the refractive index of the high refractive index layer was carried out by an FDTD method (Finite-difference time-domain method).

The space of a region having a size of 1 μm in the X-axis×1 μm in the Y-axis×0.1 μm in the Z-axis was partitioned at an increment of 0.005 μm, and calculation of the electromagnetic field in each of the regions was performed.

As the boundary conditions in the directions of the X-axis and the Y-axis, the periodic boundary conditions were applied, and as the boundary conditions in the direction of the Z-axis, complete absorption boundary conditions were applied.

In a region of a thickness of 0.1 μm in the direction of thickness Z-axis in a medium having a refractive index of 1.5 at a wavelength of 10 μm, an analysis of a structure which had the shape, average particle size, average thickness, the value (aspect ratio) obtainable by dividing the average particle size D of flat metal particles by the average thickness T, and the volume fraction as described in Table 2, and in which particles of the material described in Table 2 were planarly oriented and dispersed randomly, was carried out. The region having a thickness of 0.1 μm corresponds to the high refractive index layer.

Figure 7:
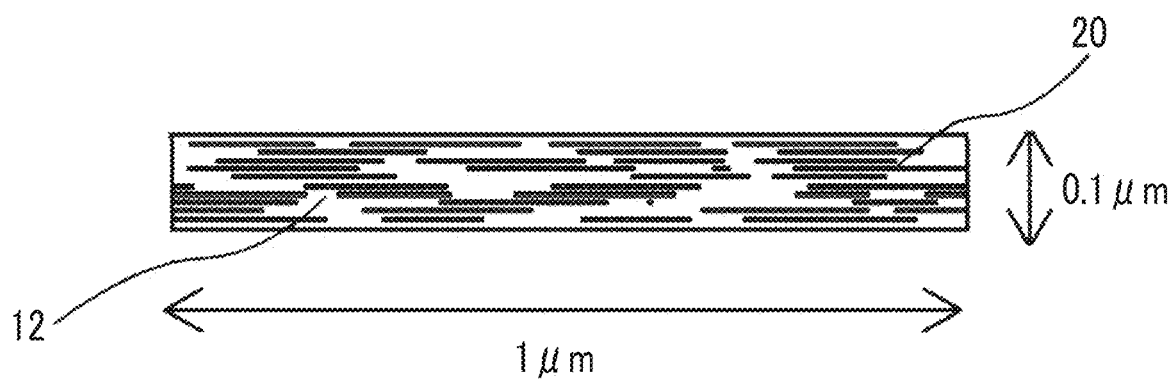
FIG. 7 is a schematic cross-sectional view of the structure of the high refractive index layer related to Example B11.
Figure 8:
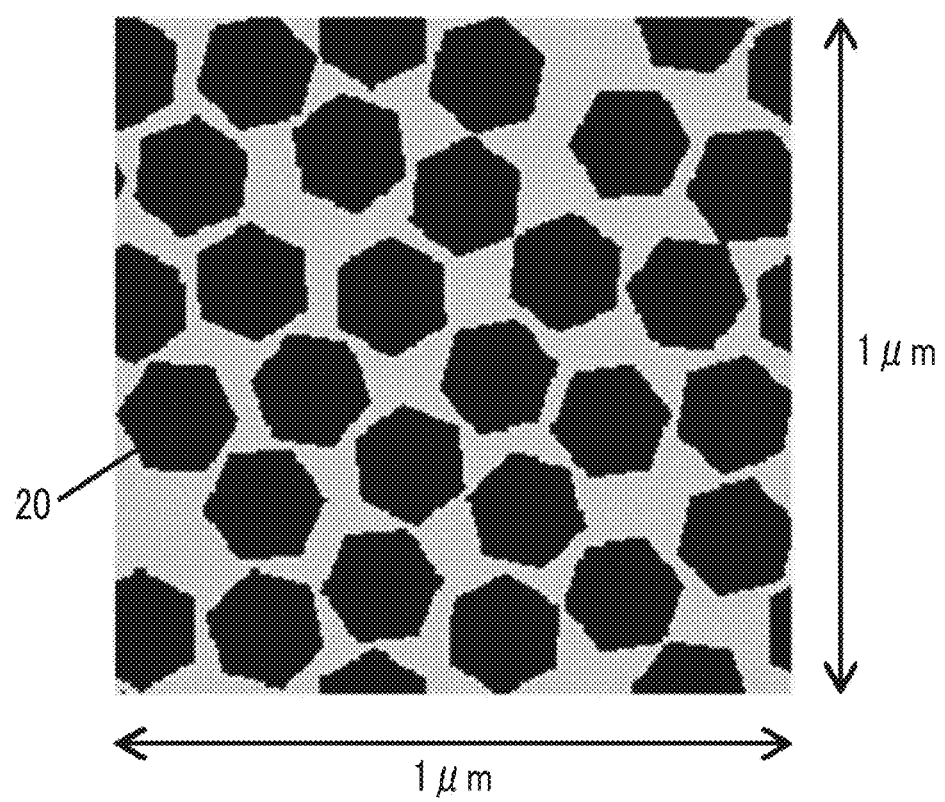
FIG. 8 is a schematic top view of the structure of the high refractive index layer related to Example B11.

As an example, a schematic cross-sectional view of the structure of a polymer film according to Example B11 is shown in FIG. 7, and a schematic top view is shown in FIG. 8.

For each of the high refractive index layers described in Table 2, plane waves having a wavelength of 10 μm were made incident from the point of origin of the Z-axis, and derivation of the refractive index of the high refractive index layer at the wavelength of 10 μm was carried out using the method described in D. R. Smith, et al., Phys. Rev. B65, 195104 (2002).

The results of performing an investigation for various particles having different aspect ratios are described in Table 2 (Examples B1 to B7 and Comparative Examples B1 to B3).

In Table 2, the description of "flat plate hexagon" in the column for flat metal particles means that the two principal planes carried by a flat metal particle both have a regular hexagonal shape.

As shown in Examples B1 to B7, it was found that in a case in which the aspect ratio is larger than 3, a high refractive index layer having a refractive index of more than 3 is formed. On the other hand, as shown in Comparative Examples B1 to B3, it was found that in a case in which the aspect ratio is smaller than 3, a refractive index of more than 3 is not obtained.

Figure 9:
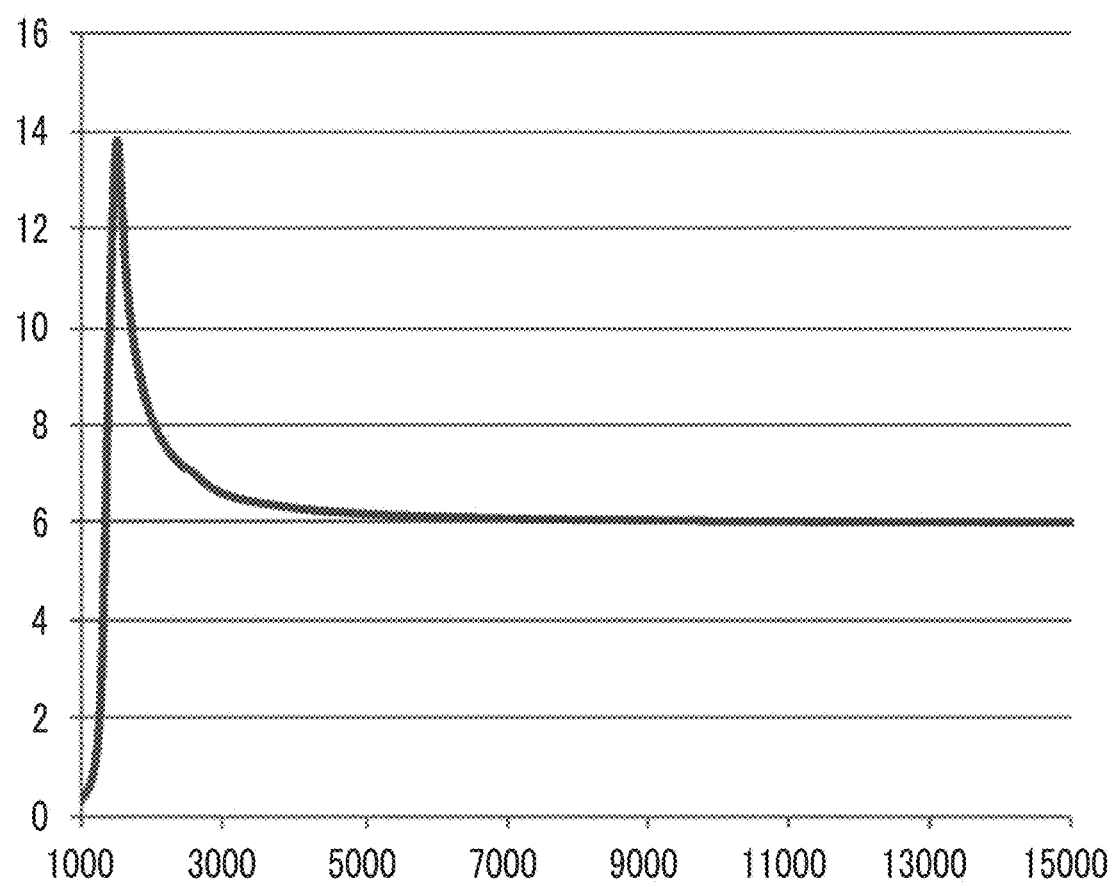
FIG. 9 is a graph showing the wavelength dispersion characteristics of the refractive index of the high refractive index layer related to Example B6.

With regard to the structure of the high refractive index layer according to Example B6, the wavelength dispersion characteristics of the refractive index of the high refractive index layer are shown in FIG. 9. In FIG. 9, the axis of ordinate represents the refractive index, and the axis of abscissa represents the wavelength (nm). It was found that there is a region in which the refractive index becomes specifically large owing to plasmon resonance near a wavelength of 1,000 nm to 2,000 nm. Furthermore, it was found that in a region on the longer wavelength side than this, almost flat refractive index characteristics are obtained at least up to near 50 and a refractive index of 3 or higher is obtained.

[Evaluation of Volume Fraction of Flat Metal Particles]

Models in which the volume fractions of the flat metal particles were different were produced, and results obtained by investigating the models are described in Examples B1 and B8 to B11 and Comparative Examples B4 and B5.

In Examples B8 to B11 and Comparative Examples B4 and B5, the volume fractions of the flat metal particles were modified as described in Table 2. The analysis of the refractive index according to an FDTD method was carried out in the same manner as in Examples B1 to B7 and Comparative Examples B1 to B3 as described above.

The evaluation results are described in Table 3.

In Table 3, the description of "-" described in the columns of the shape of flat metal particles and the like represents that the flat metal particles are not included.

TABLE 2

| | Shape of flat metal particles | Average particle size (μm) | Average thickness of flat metal particles (nm) | Aspect ratio | Volume fraction (volume %) | Material for flat metal particles | Degree of planar orientation (°) | Plasmon resonance wavelength (nm) | Refractive index (10 μm) |
|---|---|---|---|---|---|---|---|---|---|
| Example B1 | Flat plate hexagon | 30 | 10 | 3 | 20 | Ag | 0 | 520 | 3.0 |
| Example B2 | Flat plate hexagon | 40 | 10 | 4 | 20 | Ag | 0 | 560 | 3.2 |
| Example B3 | Flat plate hexagon | 50 | 10 | 5 | 20 | Ag | 0 | 700 | 3.4 |
| Example B4 | Flat plate hexagon | 100 | 10 | 10 | 20 | Ag | 0 | 900 | 4.2 |
| Example B5 | Flat plate hexagon | 150 | 10 | 15 | 20 | Ag | 0 | 1100 | 4.8 |
| Example B6 | Flat plate hexagon | 250 | 10 | 25 | 20 | Ag | 0 | 1400 | 6.0 |
| Example B7 | Flat plate hexagon | 300 | 20 | 15 | 20 | Ag | 0 | 1150 | 5.0 |
| Comparative Example B1 | Flat plate hexagon | 10 | 10 | 1 | 20 | Ag | 0 | 440 | 2.2 |
| Comparative Example B2 | Flat plate hexagon | 20 | 10 | 2 | 20 | Ag | 0 | 480 | 2.6 |
| Comparative Example B3 | Spherical shape | 20 | 20 | 1 | 20 | Ag | 0 | 440 | 2.3 |

TABLE 3

|  | Shape of flat metal particles | Average particle size (μm) | Average thickness of flat metal particles (nm) | Aspect ratio | Volume fraction (volume %) | Material for flat metal particles | Degree of planar orientation (°) | Plasmon resonance wavelength (nm) | Refractive index (10 μm) |
|---|---|---|---|---|---|---|---|---|---|
| Example B1 | Flat plate hexagon | 30 | 10 | 3 | 20 | Ag | 0 | 520 | 3.0 |
| Example B8 | Flat plate hexagon | 30 | 10 | 3 | 30 | Ag | 0 | 600 | 3.6 |
| Example B9 | Flat plate hexagon | 30 | 10 | 3 | 45 | Ag | 0 | 700 | 4.6 |
| Example B10 | Flat plate hexagon | 30 | 10 | 3 | 60 | Ag | 0 | 800 | 6.0 |
| Example B11 | Flat plate hexagon | 150 | 10 | 15 | 45 | Ag | 0 | 1300 | 8.3 |
| Comparative Example B4 | — | — | — | — | — | — | — | — | 1.5 |
| Comparative Example B5 | Flat plate hexagon | 30 | 10 | 3 | 10 | Ag | 0 | 480 | 1.9 |

[Evaluation of Shape of Flat Metal Particles]

For various flat metal particles having different shapes, results obtained by performing an investigation are described in Examples B5 and B12 to B14.

In Examples B12 to B14, the shape of the flat metal particles was changed as described in Table 4. The analysis of the refractive index according to an FDTD method was carried out in the same manner as in Examples B1 to B7 and Comparative Examples B1 to B3 as described above.

The evaluation results are described in Table 4.

In Table 4, the description of "flat plate triangle" in the column of the shape of the flat metal particles means that the two principal planes of a flat metal particles both have a regular triangular shape, the description of "flat plate octagon" means that the two principal planes of a flat metal particle both have a regular octagonal shape, and the description of "flat plate circle" means that the two principal planes of a flat metal particles both have a circular shape.

As shown in Examples B5 and B8 to B14, it was found that in a case in which the shape of the principal planes is a polygonal shape, a high refractive index layer having a refractive index of 3.0 or higher is obtained. Particularly, as described in B5, B13, and B14, it was found that in the case of a polygonal shape such as a hexagonal shape or higher polygonal shape, or a circular shape, the refractive index becomes particularly high.

[Evaluation of Material for Flat Metal Particles]

For various particles formed from different materials, the results obtained by performing an investigation are described in Examples B5 and B15 to B17 and Comparative Example B6.

In Examples B15 to B17 and Comparative Example B6, the material for the flat metal particles was changed as described in Table 5. The analysis of the refractive index according to an FDTD method was carried out in the same

TABLE 4

|  | Shape of flat metal particles | Average particle size (μm) | Average thickness of flat metal particles (nm) | Aspect ratio | Volume fraction (volume %) | Material for flat metal particles | Degree of planar orientation (°) | Plasmon resonance wavelength (nm) | Refractive index (10 μm) |
|---|---|---|---|---|---|---|---|---|---|
| Example B5 | Flat plate hexagon | 150 | 10 | 15 | 30 | Ag | 0 | 1100 | 4.8 |
| Example B12 | Flat plate triangle | 150 | 10 | 15 | 30 | Ag | 0 | 1100 | 4.0 |
| Example B13 | Flat plate octagon | 150 | 10 | 15 | 30 | Ag | 0 | 1100 | 4.94 |
| Example B14 | Flat plate circle | 150 | 10 | 15 | 30 | Ag | 0 | 1150 | 5.2 | manner as in Examples B1 to B7 and Comparative Examples B1 to B3 as described above.

The evaluation results are described in Table 5.

TABLE 5

| | Shape of flat metal particles | Average particle size (μm) | Average thickness of flat metal particles (nm) | Aspect ratio | Volume fraction (volume %) | Material for flat metal particles | Degree of planar orientation (°) | Plasmon resonance wavelength (nm) | Refractive index (10 μm) |
|---|---|---|---|---|---|---|---|---|---|
| Example B5 | Flat plate hexagon | 150 | 10 | 15 | 20 | Ag | 0 | 1100 | 4.8 |
| Example B15 | Flat plate hexagon | 150 | 10 | 15 | 20 | Au | 0 | 1050 | 4.5 |
| Example B16 | Flat plate hexagon | 150 | 10 | 15 | 20 | Cu | 0 | 800 | 4.3 |
| Example B17 | Flat plate hexagon | 150 | 10 | 15 | 20 | Al | 0 | 700 | 4.1 |
| Comparative Example B6 | Flat plate hexagon | 150 | 10 | 15 | 20 | SiO$_2$ | 0 | — | 1.8 |

As shown in Examples B5 and B15 to B17, it was found that in a case in which metal particles formed from Ag, Au, Cu, and Al were used, high refractive index layers having a refractive index of more than 3 are obtained. Particularly, in the case of using Ag, the refractive index was the highest. On the other hand, as shown in Comparative Example B6, it was found that in the case of using SiO$_2$, a refractive index of more than 3 is not obtained.

[Evaluation of Planar Orientation of Flat Metal Particles]

For films in which particles having different degrees of planar orientation were dispersed, results obtained by performing an investigation are described in Examples B5 and B18 and Comparative Example B7. The evaluation results are described in Table 6. It was found that in a case in which the degree of planar orientation is smaller than 30°, a high refractive index layer having a refractive index of more than 3 is formed. On the other hand, it was found that in a case in which planar orientation is not achieved (the degree of planar orientation is larger than 30°), a refractive index of larger than 3 is not obtained.

TABLE 6

| | Shape of flat metal particles | Average particle size (μm) | Average thickness of flat metal particles (nm) | Aspect ratio | Volume fraction (volume %) | Material for flat metal particles | Degree of planar orientation (°) | Plasmon resonance wavelength (nm) | Refractive index (10 μm) |
|---|---|---|---|---|---|---|---|---|---|
| Example B5 | Flat plate hexagon | 150 | 10 | 15 | 20 | Ag | 0 | 1100 | 4.8 |
| Example B18 | Flat plate hexagon | 150 | 10 | 15 | 20 | Ag | 20 | 900 | 4.0 |
| Comparative Example B7 | Flat plate hexagon | 150 | 10 | 15 | 20 | Ag | 40 | — | 2.8 |

As described above, the particular high refractive index layer, which is a layer containing a binder and flat metal particles, and in which the value (aspect ratio) obtainable by dividing the average particle size of the flat metal particles by the average thickness is 5 or greater, the principal planes of the flat metal particles are planarly oriented in the range of 0° to 30° with respect to the surface of the high refractive index layer, the volume fraction of the flat metal particles in the high refractive index layer is 30% by volume or higher, and the flat metal particles are laminated in two or more layers, exhibits a refractive index of 3.0 or higher for infrared radiation. Therefore, the particularly high refractive index layer can be suitably used in the infrared absorptive material according to the present disclosure.

<Evaluation of Infrared Absorptive Material>

[Production of High Refractive Index Layer]

—Preparation of flat metal particle dispersion liquid A1—

In a reaction vessel made of NTKR-4 (manufactured by Nippon Metal Industry Co., Ltd.), 13 L of ion-exchanged water was weighed, and while the ion-exchanged water was stirred using a chamber equipped with an agitator having four sheets of propellers made of NTKR-4 and four sheets of paddles made of NTKR-4 attached to a shaft made of SUS316L, 1.0 L of a 10 g/L aqueous solution of trisodium citrate (anhydride) was added thereto. The mixture was kept warm at 35° C. 0.68 L of a 8.0 g/L aqueous solution of polystyrene sulfonate was added thereto, and 0.041 L of an aqueous solution of sodium borohydride prepared at 23 g/L using a 0.04 mol/L aqueous solution of sodium hydroxide was further added thereto. 13 L of a 0.10 g/L aqueous solution of silver nitrate was added thereto at a rate of 5.0 L/min.

1.0 L of a 10 g/L aqueous solution of trisodium citrate (anhydride) and 11 L of ion-exchanged water were added thereto, and 0.68 L of a 80 g/L aqueous solution of potassium hydroquinone sulfate was further added thereto. Stirring was applied at 800 rpm, 8.1 L of a 0.10 g/L aqueous solution of silver nitrate was added thereto at a rate of 0.95 L/min, and then the temperature was decreased to 30° C.

8.0 L of a 44 g/L aqueous solution of methylhydroquinone was added thereto, and then the entire amount of an aqueous gelatin solution at 40° C. that will be described below was added thereto. Stirring was applied at 1,200 rpm, and the entire amount of a mixed liquid of a white precipitate of silver sulfite that will be described below was added thereto.

In a stage in which the pH change of the prepared liquid stopped, 5.0 L of a 1 mol/L aqueous solution of NaOH was added at a rate of 0.33 L/min. Subsequently, 0.078 L of 70 g/L 1,2-benzisothiazolin-3-one (dissolved by regulating the aqueous solution to become alkaline with NaOH) was added thereto. In this manner, a flat metal particle dispersion liquid A1 was prepared.

—Preparation of Aqueous Gelatin Solution—

16.7 L of ion-exchanged water was weighed in a dissolution tank made of SUS316L. While low-speed stirring was carried out with an agitator made of SUS316L, 1.4 kg of alkali-treated bovine bone gelatin that had been subjected to a deionization treatment (GPC weight-average molecular weight 200,000) was added thereto. Furthermore, 0.91 kg of alkali-treated bovine bone gelatin (GPC weight-average molecular weight 21,000) that had been subjected to a deionization treatment, a proteolytic enzyme treatment, and an oxidation treatment using hydrogen peroxide was added thereto. Subsequently, the temperature was increased to 40° C., and swelling and dissolution of gelatin was carried out simultaneously to completely dissolve gelatin.

—Preparation of Mixed Liquid of White Precipitate of Silver Sulfite—

8.2 L of ion-exchanged water was weighed in a dissolution tank made of SUS316L, and 8.2 L of a 100 g/L aqueous solution of silver nitrate was added thereto. While high-speed stirring was carried out with an agitator made of SUS316L, 2.7 L of a 140 g/L aqueous solution of sodium sulfite was added in a short period of time, and thereby a mixed liquid including a white precipitate of silver sulfite was prepared. This mixed liquid was prepared immediately before use.

—Preparation of Flat Metal Particle Dispersion Liquid B1—

800 g of the flat metal particle dispersion liquid A1 was collected in a centrifuge tube, and the dispersion liquid was adjusted to a pH in the range of 9.2±0.2 at 25° C. using a 1 mol/L aqueous solution of sodium hydroxide or 0.5 mol/L sulfuric acid. A centrifugation operation was carried out using a centrifuge (himac CR22GIII manufactured by Hitachi Koki Co., Ltd., angle rotor R9A) by setting at 35° C. for 60 minutes at 9,000 rpm, and then 784 g of a supernatant was discarded. A 0.2 mmol/L aqueous solution of NaOH was added to flat plate particles that had precipitated to make up a total amount of 400 g, the mixture was manually stirred using a stirring rod, and a crude dispersion liquid was obtained. A crude dispersion liquid having a volume equivalent to 24 centrifuge tubes was prepared by an operation similar to the above-described operation to make up a total amount of 9,600 g, and the crude dispersion liquid was added to a tank made of SUS316L and mixed. Furthermore, 10 cc of a 10 g/L solution (diluted with a mixed liquid of methanol:ion-exchanged water=1:1 (volume ratio)) of Pluronic 31R1 (manufactured by BASF SE) was added thereto. The crude dispersion liquid mixture in the tank was subjected to batch type dispersing treatment for 120 minutes at 9,000 rpm using AUTO MIXER Model 20 manufactured by Primix Corporation (stirring unit was HOMOMIXER-MARKII). The liquid temperature during dispersing was maintained at 50° C. 800 g of the dispersion liquid thus obtained was collected again into a centrifuge tube, and a centrifugation operation was carried out using a centrifuge (himac CR22GIII manufactured by Hitachi Kiko Co., Ltd., angle rotor R9A) by setting at 35° C. for 60 minutes at 9,000 rpm, and then 760 g of the supernatant was discarded. A 0.2 mmol/L aqueous solution of sodium hydroxide was added to flat plate particles that had been precipitated to make up a total amount of 800 g, the mixture was manually stirred using a stirring rod, and a crude dispersion liquid was obtained. A crude dispersion liquid having a volume equivalent to 12 centrifuge tubes was prepared by an operation similar to the above-described operation to make up a total amount of 9,600 g, and the crude dispersion liquid was added to a tank made of SUS316L and mixed. Furthermore, 10 mL of a 10 g/L solution (diluted with a mixed liquid of methanol:ion-exchanged water=1:1 (volume ratio)) of Pluronic 31R1 (manufactured by BASF SE) was added thereto. The crude dispersion liquid mixture in the tank was subjected to batch type dispersing treatment for 120 minutes at 9,000 rpm using AUTO MIXER Model 20 manufactured by Primix Corporation (stirring unit was HOMOMIXER-MARKII). The liquid temperature during dispersing was maintained at 50° C. After dispersing, the temperature was lowered to 25° C., and then single-pass filtration was performed using a PROFILE II filter (manufactured by Pall Corporation, product type MCY1001Y030H13).

In this manner, the flat metal particle dispersion liquid A1 was subjected to a desalting treatment and a redispersing treatment, and thus a flat metal particle dispersion liquid B1 was prepared.

TABLE 7

| | Average thickness | Average particle size | Aspect ratio | Plasmon resonance wavelength (nm) | Shape |
|---|---|---|---|---|---|
| A1 (B1) | 8 nm | 120 nm | 15 | 1100 | Hexagonal flat plate |

<Preparation of Coating Liquid for Forming High Refractive Index Layer>

A coating liquid C1 was prepared at the compositional ratio of the material indicated in Table 8. The values in the table represent parts by mass.

Here, 2.78 L of a 0.1 mass % aqueous solution of chloroauric acid (manufactured by Wako Pure Chemical Industries, Ltd.) was added to 50 L of the coating liquid C1, the mixture was stirred for 4 hours at 60° C., and this was designated as coating liquid for forming a high refractive index layer C1B.

TABLE 8

| | Coating liquid C1 |
|---|---|
| Aqueous solution of polyurethane: HYDRAN HW-350 (manufactured by DIC Corporation, solid content concentration: 30% by mass) | 0.9 |
| Surfactant A: F LIPAL 8780P (manufactured by Lion Corporation, solid content 1% by mass) | 2.4 |
| Surfactant B: NAROACTY CL-95 (manufactured by Sanyo Chemical Industries, Ltd., solid content 1% by mass) | 2.4 |
| Surfactant C: (Sodium = 1,2-{bis(3,3,4,4,5,5,6,6,6-nanofluorohexylcarbonyl)} ethanesulfonate (solid content 2% by mass) | 1.0 |
| Flat metal particle dispersion liquid B1 | 84.7 |
| Water | 8.6 |

<Production of Infrared Absorptive Material C1>

On a 2-inch silicon wafer having a thickness of 0.28 mm, silver having a thickness of 200 nm was vapor deposited using an electron beam vapor deposition apparatus, EBX- 8C, manufactured by Ulvac Techno, Ltd. Next, on the silver film thus vapor deposited, spin coating of the coating liquid for forming a high refractive index layer C1B was carried out at a speed of rotation of 500 rpm using a spin coater manufactured by Mikasa Co., Ltd. Subsequently, the resultant was heated, dried, and solidified on a hot plate at 110° C. for one minute. The above-described procedure was repeated until the film thickness reached 400 nm, and thus an infrared absorptive material C1 (Example C1) was produced.

<Production of Infrared Absorptive Materials C2 to C4>

Production of infrared absorptive materials C2 to C4 (Examples C2 to C4) was carried out in the same manner as in the production method for the infrared absorptive material C1, except that the coating liquid for forming a high refractive index layer C1B was used, and the film thickness of the high refractive index layer was adjusted to the film thicknesses described in Table 9.

<Evaluation of Infrared Absorption Characteristics>

The infrared reflectance R (%) and transmittance T (%) at the time of incidence at the front of the infrared absorptive materials of Examples C1 to C4 were measured using FTS-7000 manufactured by Varian, Inc. From the infrared reflectance and transmittance thus obtained, infrared absorbance A was calculated according to the following formula. The infrared absorbance thus obtained is described in Table 9 as the absorbance.

$$A = 100 - T - R$$

Figure 10:
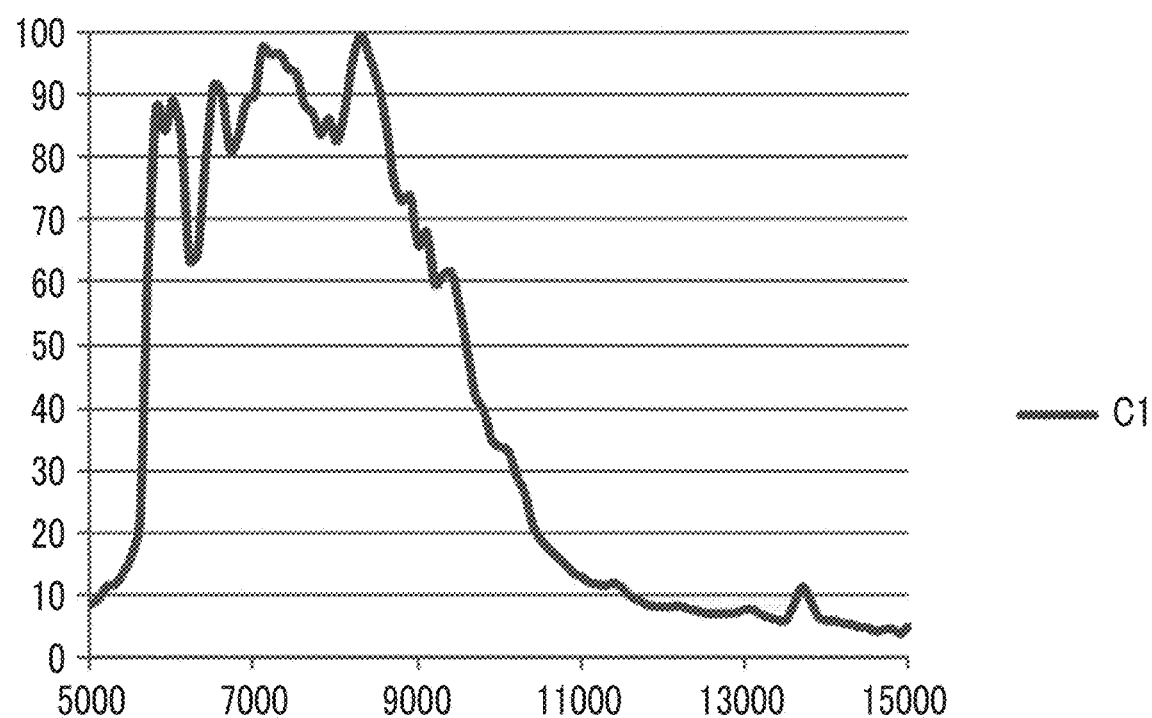
FIG. 10 is a graph showing the absorption spectrum of the infrared absorptive material related to Example C1.

With regard to the infrared absorptive materials C1 to C4, the absorption spectra calculated as the infrared absorbance A are shown in FIG. 10 or FIG. 11.

In FIG. 10, the axis of ordinate represents the absorbance (%), and the axis of abscissa represents the wavelength (nm).

In FIG. 11, the axis of ordinate represents the absorbance (%), and the axis of abscissa represents the wavelength (μm).

From the above-described absorption spectra, the full-width at half maximum F of absorption was evaluated, and in a case in which the value of Γ/λ was less than 0.4, the wavelength selectivity was considered satisfactory (1); in a case in which the value of Γ/λ was 0.4 or more and less than 0.6, the wavelength selectivity was considered acceptable (2); while in a case in which the value of Γ/λ was 0.6 or more, the wavelength selectivity was considered defective (3). The evaluation results are described in the column of "Wavelength selectivity" in Table 9. It can be said that as the value of Γ/λ is smaller, the wavelength selectivity is superior.

The extinction coefficient in Table 9 is determined by measuring the spectral reflectance and the spectral transmittance using a Fourier transform infrared spectrophotometer (FTIR) and calculating the value based on the multiple reflection theory and the Fresnel interference theory.

In Table 9, the units of the film thickness d and the wavelength λ are nm.

The refractive index in Table 9 was calculated as the arithmetic mean value of the results obtained by performing measurement at a wavelength in the wavelength range of 2 μm to 50 μm at an increment of 1 μm.

It was confirmed that in all of the infrared absorptive materials C1 to C4, wavelength selectivity is obtained.

Thus, as shown in the Examples, according to the present disclosure, it was confirmed that an infrared absorptive material exhibiting excellent wavelength selective absorbency with respect to infrared light at any wavelength included in the wavelength range of 2 μm to 50 μm is obtained.

The disclosure of JP2017-183426 filed on Sep. 25, 2017, is incorporated herein in its entirety by reference.

All publications, patent applications, and technical standards mentioned in this specification are herein incorporated by reference to the same extent as if each individual publication, patent application, or technical standard was specifically and individually indicated to be incorporated by reference.

EXPLANATION OF REFERENCES

10: reflective layer
12: high refractive index layer
20: flat metal particle
30: infrared absorptive material
D: particle size (equivalent circle diameter)
T: thickness of flat metal particle

What is claimed is:

1. An infrared absorptive material comprising:
   a high refractive index layer having a refractive index of 3.0 or higher for infrared light at a wavelength of 2 μm to 50 μm and having a thickness of 8 nm to 15,000 nm; and
   a reflective layer positioned on one face of the high refractive index layer.

2. The infrared absorptive material according to claim 1, wherein the optical path length n×d, which is the product between the thickness d and the refractive index n of the high refractive index layer, satisfies the following Formula 1:

$$\left(\frac{1}{4} + \frac{1}{2}m\right)\lambda - \frac{1}{8}\lambda < n \times d < \left(\frac{1}{4} + \frac{1}{2}m\right)\lambda + \frac{1}{8}\lambda \quad \text{Formula 1}$$

in Formula 1, m represents an integer of 0 or greater; λ represents the wavelength of infrared radiation that is intended to be absorbed; and the units of λ and d are nm.

TABLE 9

| | | High refractive index layer | | | | | | | | Wavelength selectivity |
|---|---|---|---|---|---|---|---|---|---|---|
| | Reflective layer Material | Coating liquid | Film thickness d | λ | Refractive index | Extinction coefficient | Formula 1 m = 0 | Absorbance | FWHM Γ | Γ/λ | |
| Example C1 | Ag | Coating liquid C1 | 400 | 7200 | 4.5 | 0.82 | Satisfied | 97% | 4200 | 0.583333 | 2 |
| Example C2 | Ag | Coating liquid C3 | 120 | 5280 | 9.4 | 0.26 | Satisfied | 96% | 900 | 0.170455 | 1 |
| Example C3 | Ag | Coating liquid C3 | 200 | 8650 | 9.6 | 0.65 | Satisfied | 96% | 2700 | 0.312139 | 1 |
| Example C4 | Ag | Coating liquid C3 | 280 | 11400 | 9.4 | 0.35 | Satisfied | 90% | 2600 | 0.22807 | 1 |

3. The infrared absorptive material according to claim 2, wherein m=0.

4. The infrared absorptive material according to claim 1, wherein the high refractive index layer contains a binder and flat metal particles, the value obtainable by dividing an average particle size of the flat metal particles by an average thickness is 5 or greater, principal planes of the flat metal particles are planarly oriented in a range of 0° to 30° with respect to a surface of the high refractive index layer, a volume fraction of the flat metal particles in the high refractive index layer is 30% by volume or more, and the flat metal particles are laminated in two or more layers.

5. The infrared absorptive material according to claim 4, wherein the flat metal particles are randomly arranged in a surface direction of the high refractive index layer.

6. The infrared absorptive material according to claim 4, wherein the flat metal particles contain at least silver.

7. The infrared absorptive material according to claim 4, wherein the shape of the principal planes of the flat metal particles is a polygonal shape such as a hexagonal shape or higher polygonal shape, or a circular shape.

8. The infrared absorptive material according to claim 1, wherein the refractive index of the high refractive index layer for infrared light at a wavelength of 2 μm to 50 μm is 5.0 to 30.

9. An infrared sensor comprising:
the infrared absorptive material according to claim 1.

10. A wavelength selective light source comprising:
the infrared absorptive material according to claim 1.

11. A radiation cooling system comprising:
the infrared absorptive material according to claim 1.

* * * * *